United States Patent [19]
Nelson

[11] Patent Number: 5,918,862
[45] Date of Patent: Jul. 6, 1999

[54] HIGH DAMPING PNEUMATIC ISOLATOR

[75] Inventor: Peter G. Nelson, Newburyport, Mass.

[73] Assignee: Technical Manufacturing Corporation, Peabody, Mass.

[21] Appl. No.: 08/835,823

[22] Filed: Apr. 16, 1997

[51] Int. Cl.⁶ .................................................. F16F 9/04
[52] U.S. Cl. ........................................ 267/64.23; 267/121
[58] Field of Search ............................. 267/64.19, 64.21, 267/64.23, 64.26, 64.27, 121, 136; 248/613, 621, 631

[56] References Cited

U.S. PATENT DOCUMENTS

| | | | |
|---|---|---|---|
| 2,056,106 | 9/1936 | Kuhn ................................. | 267/64.27 X |
| 4,360,184 | 11/1982 | Reid, III . | |
| 4,848,524 | 7/1989 | Hosan et al. ..................... | 267/64.26 X |
| 5,071,108 | 12/1991 | Houghton, Jr. . | |
| 5,186,439 | 2/1993 | McDonagh et al. ............. | 267/64.27 X |
| 5,379,980 | 1/1995 | Houghton, Jr. et al. . | |
| 5,433,302 | 7/1995 | Heide . | |

*Primary Examiner*—Lee W. Young
*Attorney, Agent, or Firm*—Samuels, Gauthier & Stevens

[57] ABSTRACT

A pneumatic isolator supports a payload and dampens the vertical and/or horizontal motion of the payload. The isolator has an air chamber and a damping chamber. A viscous medium is disposed in the damping chamber. A gimbal piston head is flexibly secured to the isolator and a piston well extends downwardly from the piston head and is immersed in the viscous medium. A support rod supports the payload, passes through and is supported by the piston well. The outer surface of the piston well is spaced apart from the opposed surface of the damping chamber and defines a gap therebetween. When horizontal and/or vertical motion acts on the isolator, the piston well moves displacing the viscous medium in the gap resulting in a damping force which is generally proportional and opposite to the velocity of the piston well moving against the viscous medium.

18 Claims, 3 Drawing Sheets ic isolator

HIGH DAMPING PNEUMATIC ISOLATOR

FIELD OF THE INVENTION

Pneumatic isolators which support a load and dampen vertical and horizontal motions and combinations of the same.

BACKGROUND AND BRIEF SUMMARY OF THE INVENTION

Vibration in the form of very low amplitude, omnidirectional motion is naturally present in any building, and is present at varying levels at all frequencies up to very high acoustic frequencies. The acceleration associated with such vibrations introduces stress into the structures of many types of sensitive equipment and can deform those structures enough to degrade their performance. Soft pneumatic isolators can isolate such payloads from such environmental noise for frequencies as low as 1 Hz and above. These isolators provide isolation for all degrees of freedom of the payload (e.g. vertical, horizontal, tilt and twist). A payload supported on such pneumatic isolators will typically respond to multi-axis floor motions or forces directly applied to it by moving in many degrees of freedom. Such isolators must provide internal damping to limit the duration and amplitude of such response.

Another function of pneumatic isolators is to dampen the motion of the payload caused by movement of components supported by the payload. In the semiconductor industry, for example, it is common to have a heavy and fast moving stage (robot) carrying a wafer, which stops at different 'sites' on the wafer to make an inspection. The stage motion causes the payload to move on its isolators. The measurement, however, cannot take place until this motion dies away. Thus it is critically important to the throughput of such systems that the isolators damp as quickly as possible.

The basic two-chamber pneumatic isolator, used for many years, is limited in how much damping it can provide. It is known to use external dampers of different types to enhance damping but the problem with this is the mounting, adjustment, and alignment of these external dampers. Some systems implement horizontal dampers but these dampers do nothing to improve the vertical damping of the isolators.

Exemplary of prior art, two chamber isolators is the Gimbal Pistons® isolator, Technical Manufacturing Corp., Peabody, Mass. As the payload moves up and down, air is forced through a small orifice between the two chambers. This damps the system, but only for the vertical motion of the isolator's piston. Moreover, the level of damping is limited by the finite ratio of the upper chamber's air volume to the lower chamber's air volume (the smaller this ratio the better). With this design the ratio of the isolator's spring to damping constant is approximately independent of the payload's mass. This gives a 'Q', or quality factor, which is nearly independent of changes in the payload (the settling time for the system does not change with changing payloads).

Horizontal damping in the system is less than the vertical damping and comes mainly from two sources: horizontal to tilt coupling, and an elastomer in the piston well. The first is a means for horizontal motion to be converted into tilt motion of the payload, which in turn 'exercises' the isolators in the vertical direction. This happens when the center of mass of the payload is above the effective support points for the isolators (which is the usual case). The elastomer in the bottom of the piston well is also compressed with horizontal payload motions, and since it is not perfectly elastic, it damps the motion (just as some rubber materials will not bounce well when dropped on the floor).

An isolator such as described in U.S. Pat. No. 4,364,184 has previously been modified such that the inner chamber surrounding the support rod was half-filled with a 10,000 cst oil. This improved the damping, but could not be used to bring an isolator to critical damping.

The present invention uses an improved geometry of the just described isolator and a relatively viscous medium to achieve the high levels of force required to reach critical or near critical damping.

The present invention provides high levels of damping for both the vertical and horizontal motions of the payload. The level of the damping force (in terms of pounds of force for a given payload velocity) is fixed, however, and does not scale with the payload mass. This means, for example, that if a payload is doubled, the quality factor Q is also doubled. The preferred use for this type of isolator is for systems in which robotic motions are strongly driving the payload (such as in semiconductor manufacturing equipment). In such equipment the payload is usually fixed, and the damping can be adjusted to the desired level during the manufacture of the isolator by changing the viscosity of the viscous medium, the geometry of the tube/piston well combination, or simply changing the level of viscous medium in the isolator.

The present invention embodies a multi-axis isolator (two horizontal directions and vertical) and uses a viscous medium for damping which increases the level of damping force 2 to 10 times over that provided by the best prior art air-based dampers, for both vertical and horizontal motions. This level of damping can bring a system to 'critical damping'.

Broadly, the invention comprises a pneumatic isolator having a housing which defines a pneumatic air chamber. Within the air chamber is a damping chamber defined by a chamber wall. A viscous medium is disposed in the damping chamber. A bob, having a longitudinal axis, is rigidly fixed to the payload with regard to its vertical motion and immersed in the viscous medium. In response to horizontal and/or vertical motion of the payload, the bob moves through the viscous medium and acts to dampen the payload motion in all translational motions.

In a preferred embodiment the bob comprises a gimbal piston head and a piston well having a bearing surface. A rod-like support member supports a payload, passes through the piston well and engages the bearing surface. The piston well extends into the damping chamber and into the viscous medium. The outer surface of the piston well is spaced apart from the opposed surface of the damping chamber and defines a gap therebetween. The viscous medium fills at least a portion of the gap. When the horizontal and/or vertical motion acts on the isolator, the piston well moves displacing the viscous medium in the gap resulting in a damping force which is generally proportional and opposite to the velocity of the piston well moving against the viscous medium.

Although the preferred embodiment will be described with the bob being exemplified by a piston assembly, as used in this disclosure, the term bob also includes isolators such as those vibration isolation mounts which have an internal pendulum assembly and piston assembly which serve the same function as the present invention's gimbal well, and could be similarly modified for improved damping. Also, the term bob includes those isolators which provide for vertical and horizontal isolation with a separate assembly for each. Horizontal isolation is provided by a pendulum assembly which supports a pneumatic vertical isolator (a piston, rolling diaphragm, and a two-chamber air tank). Sometimes these isolators use viscous fluid to damp the horizontal motion of the air chamber (which is connected to the payload by shearing the rolling rubber diaphragm). Such isolators could have a secondary fluid bath for damping the vertical motion as well, where the 'bob' of the current invention could be fastened to the vertical motion piston assembly, achieving the same end.

DESCRIPTION OF THE PREFERRED EMBODIMENT(S)

Figure 1:
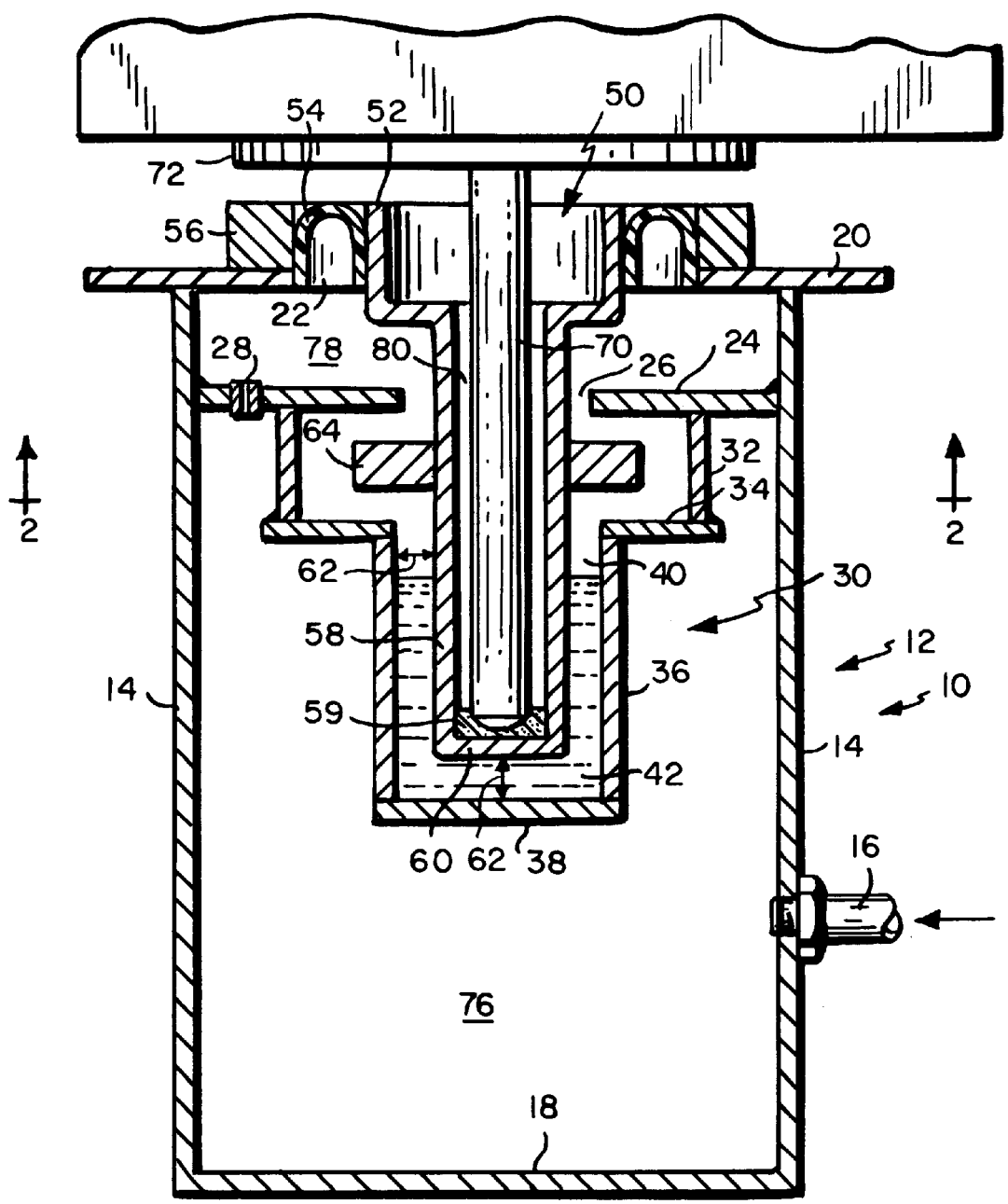
FIG. 1 shows a cross-section of the preferred embodiment of the invention.
Figure 2:
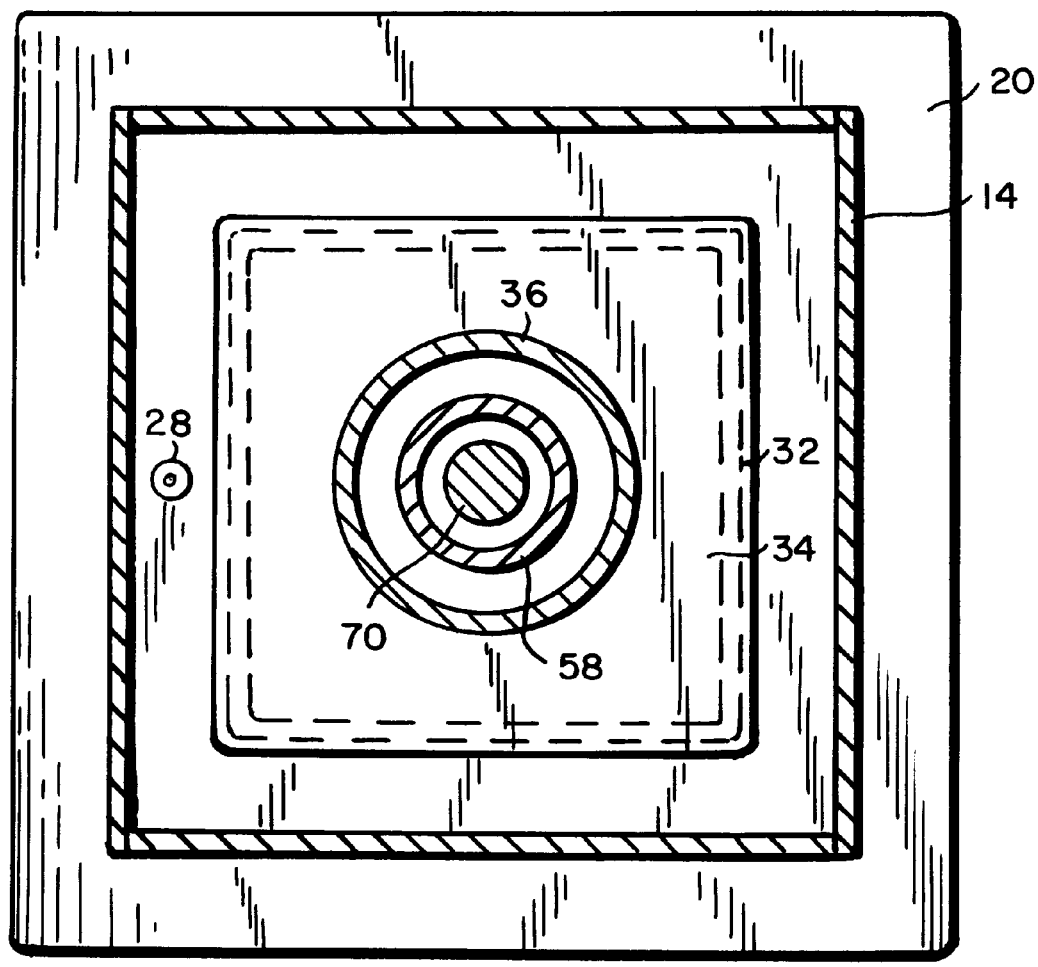
FIG. 2 is a bottom view of FIG. 1 taken along lines 2—2 of FIG. 1.

Referring to FIG. 1, a system embodying the invention is shown generally at 10 and comprises a housing 12 having walls 14, one wall 14 having a pneumatic inlet 16. The walls 14 are supported by a floor 18. A first apertured support plate 20 is secured to the upper ends of the walls 14 and is characterized by a circular opening 22.

A second apertured plate 24 is joined to the walls 14 and is characterized by an opening or keyway 26 and a damping orifice 28. In most instances the damping function of the orifice 28 is replaced by the damping of viscous fluid, and can be removed.

A stepped tubular bulkhead 30 depends from the underside of the second apertured plate 24. The bulkhead 30 includes an upper wall 32, a step 34, a tube 36 and a floor 38. The tube 36 and floor 38 define a damping chamber 40 which is filled with a viscous medium 42.

A gimbal piston assembly 50 is flexibly secured to the housing 10. The assembly 50 comprises a gimbal piston head 52 secured to an annular flexible rolling diaphragm 54. The diaphragm 54 is secured to the support plate 20 by a clamping ring 56. A gimbal piston well 58 depends from the piston head 52 and extends into the chamber 40. The piston well 58 has a bearing surface 60. An elastomer 59 is received on the bearing surface 60. The outer surface of the piston well 58 defines with the opposed surface of the chamber 40 a gap 62. Secured to the piston well 58 is a travel limit key 64.

A support rod 70 passes through the piston head 52 into the piston well 58 and is supported and centered at one end by the elastomer 59 on the bearing surface 60. The support rod is joined at its other end to a support plate 72 which in turn supports a payload. The opposed surfaces of the support rod 70 and piston well 58 define a gap 80.

The walls 14, floor 18, bulkhead 30 and support plate 24 define a lower air chamber 76.

The walls 14, support plate 20, diaphragm 54 and gimbal piston assembly 50 define an upper air chamber 78 which supports the gimbal piston assembly 50.

The gap 62 between the outer surface of the piston well 58 and the opposed surface of the chamber 40 allows for horizontal and/or vertical motion in the piston assembly 50.

As the payload 50 moves sideways, vertically or tilts and the gap 62 diminishes the medium 42 is forced from the diminished clearance and flows around the well 58 from the section being pinched. Due to the extreme viscosity of the medium, there is a great resistance to this flow, and the result is a damping force on the piston well 58 (both wall and/or floor) which is generally proportional and opposite to the velocity of the piston well moving or displacing through the medium.

Preferably, the viscous medium 42 is an oil. The level of damping is readily adjustable by changing the level (volume) of the oil in the chamber 40. The oil is sealed from exposure to the outside environment. The preferred oil is a 100,000 cst methyl silicone, which is very low outgasing (cleanroom compatible) which is especially important for the semiconductor applications previously described.

Other viscous mediums within the scope of the invention include emulsions, slurries, suspensions, colloidal dispersions, and solutions. Further, these mediums can optionally include rheological additives such that when piston well moves the viscous medium in the gap will increase in viscosity in response to that movement. These dilatent mediums are well within the skill of the art.

Systems of the invention have been tested. The 'Q' has been reduced from a value of 3 (X, Y, and Z motions) and 5 (twist) for the prior art standard Gimbal Piston®, isolators to 1 (all DOFs) in the isolators of the invention. It is important to note that a 'Q' of 3 is a very typical level of vertical damping for pneumatic isolators industry-wide.

The following table illustrates the effect of this increase in damping (decrease in 'Q'). It shows how much time it takes for a prior art isolator to settle after a disturbance compared to an isolator of the invention.

Comparison in Settling Times in Seconds

| Mount vs. Attenuation | 0.1 | 0.01 | 0.001 |
| --- | --- | --- | --- |
| Prior art Mount (Twist) | 1.8 | 3.7 | 5.5 |
| Prior Art Mount (X, Y, Z) | 1.1 | 2.2 | 1.1 |
| Inventive Isolator (X, Y, Z, Twist) | 0.4 | 0.7 | 1.1 |

Figure 3A:
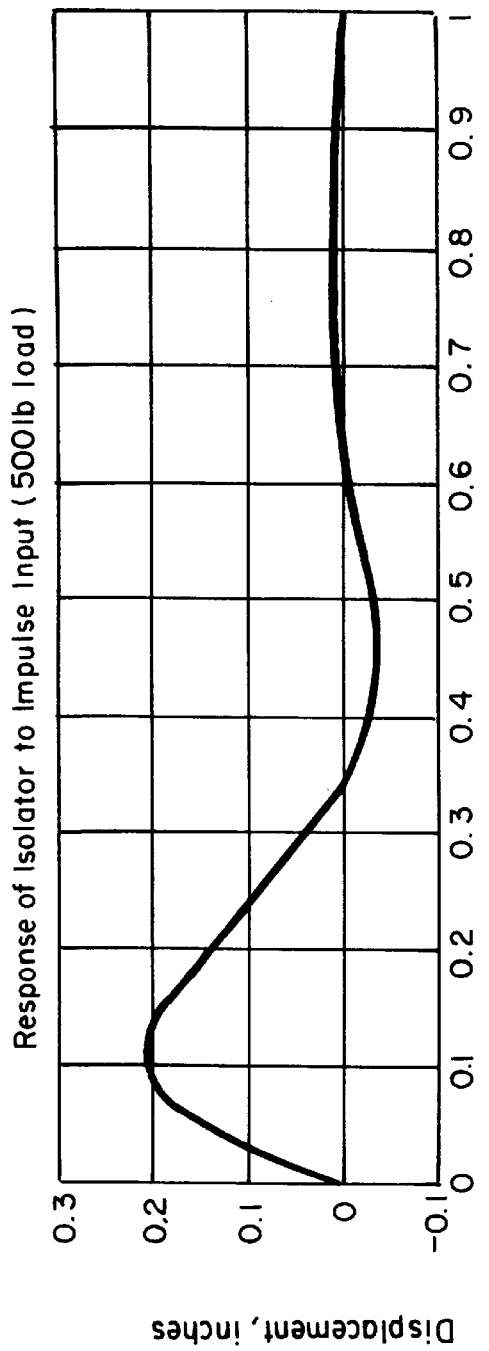
FIGS. 3a and 3b are graphs illustrating an isolator of the invention responding to a horizontal displacement.
Figure 3B:
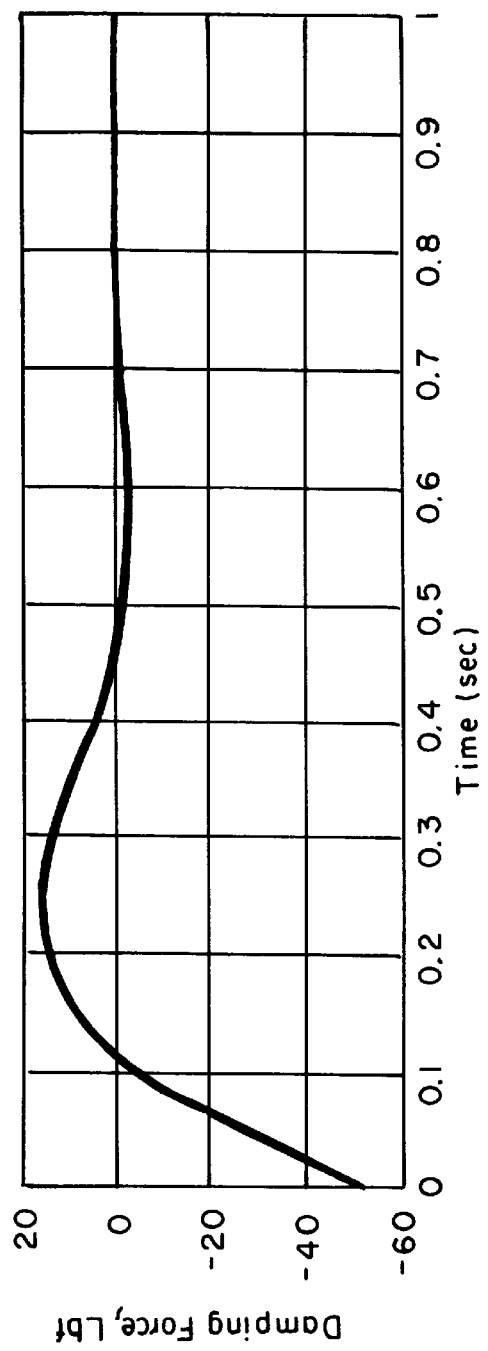

FIGS. 3a and 3b also illustrate the damping achieved with an isolator of the invention.

The gimbal piston well could be modified by attaching 'fins' or 'paddles' to it. A mating shape could be formed on the inside of the chamber wall (tube 36, FIG. 1) such as with vertical plates. This embodiment allows one to tailor the ratio of the horizontal to vertical damping in a system. Horizontal motions would force the viscous medium in and out of the gaps between the plates. Vertical motion however would only require a very minimal displacement of viscous medium.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention, what I now claim is:

1. A pneumatic isolator which supports and isolates a payload in three degrees of freedom, the isolator comprising:

a housing which defines an air chamber, the air chamber having therein a damping chamber defined by a chamber surface;

viscous medium disposed in the damping chamber;

a bob secured to the payload such that there is no vertical motion between the payload and the bob; and means for flexibly securing the bob to the housing, the bob immersed in the viscous medium, the bob having an outer surface spaced apart from an opposed surface of the damping chamber and defining a gap therebetween, the viscous medium filling a portion of the gap the remaining portion of the gap filled with a gas, the bob adapted to move in said gap in response to horizontal and/or vertical motion of the payload causing said viscous medium to be displaced resulting in a damping force applied to the payload.

2. The isolator of claim 1 wherein a rod is secured to both the payload and the bob such that there is no vertical motion between the payload and the bob.

3. The isolator of claim 1 wherein the bob comprises a gimbal piston head flexibly secured to the housing and a piston well which depends from the piston head, the outer surface of the piston well comprising the outer surface of the bob.

4. The isolator of claim 3 which comprises a rod having an upper end and a lower end, the rod is received within the piston well and the piston well is characterized by a bearing surface at the lower end thereof which surface engages the lower end of the rod and the upper end of the rod engages the payload.

5. The isolator of claim 4 comprising:

an elastomeric material on the bearing surface and wherein the rod is received on the elastomeric material and centered within the piston well.

6. The isolator of claim 3 comprising:

means for limiting the vertical travel of the piston well within the housing.

7. The isolator of claim 3 wherein the means for flexibly securing the bob to the housing comprises a diaphragm which secures the gimbal piston head to the housing.

8. The isolator of claim 1 wherein the damping chamber is a tube-like chamber.

9. The isolator of claims 3, 4, 5, 6, 7 or 8 wherein the damping force is generally proportional and opposite to the velocity of the piston well moving against the viscous medium.

10. The isolator of claim 9 wherein the viscous medium is a mineral oil.

11. The isolator of claim 10 wherein the mineral oil has a viscosity in a range of between about 10,000 to 1,000,000 cst.

12. A pneumatic isolator which supports and isolates a payload in three degrees of freedom the isolator comprising:

a housing which defines an air chamber, the air chamber having therein a damping chamber defined by a chamber surface;

viscous medium disposed in the damping chamber;

a gimbal piston head flexibly secured to the housing, a piston well depending from the piston head, the piston well immersed in the viscous medium, the outer surface of the piston well and the opposed surface of the damping chamber defining a gap therebetween, the viscous medium filling a portion of the gap the remaining portion of the gap filled with a gas;

a rod having an upper and a lower end, the upper end engaging and supporting the payload, the lower end received and supported in the piston well, the rod secured to the payload such that there is no vertical motion between the payload and the rod;

the piston well adapted to move in said gap in response to horizontal and/or vertical motion of the payload causing said viscous medium to be displaced resulting in a damping force applied to the payload.

13. The isolator of claim 12 wherein a diaphragm flexibly secures the gimbal piston head to the housing.

14. The isolator of claim 12 wherein the damping chamber is a tube-like chamber.

15. The isolator of claim 12 wherein the chamber has a bearing surface which supports the rod.

16. The isolator of claim 15 wherein there is an elastomeric material received on the bearing surface to center the rod.

17. The isolator of claim 16 wherein the viscous medium is a mineral oil.

18. The isolator of claims 12, 13, 14, 15, 16 or 17 wherein the damping force is generally proportional and opposite to the velocity of the piston well moving against the viscous medium.

* * * * *